Nov. 28, 1933.　　　　　P. T. ROBIN　　　　　1,936,954
VEHICLE
Filed Oct. 25, 1930
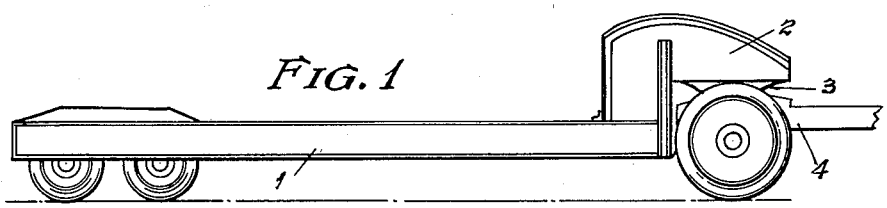
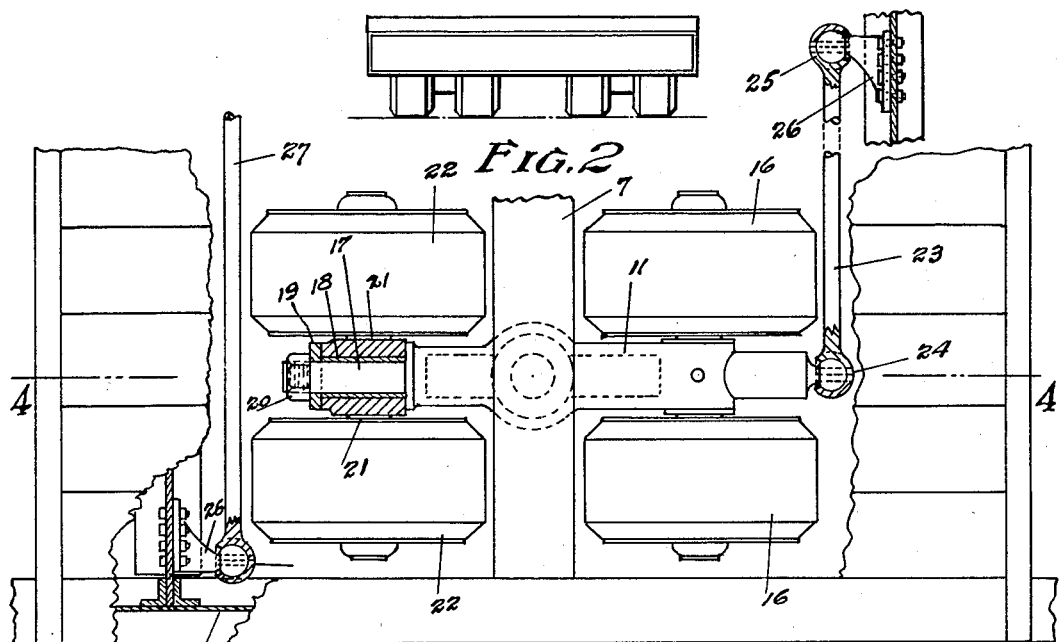
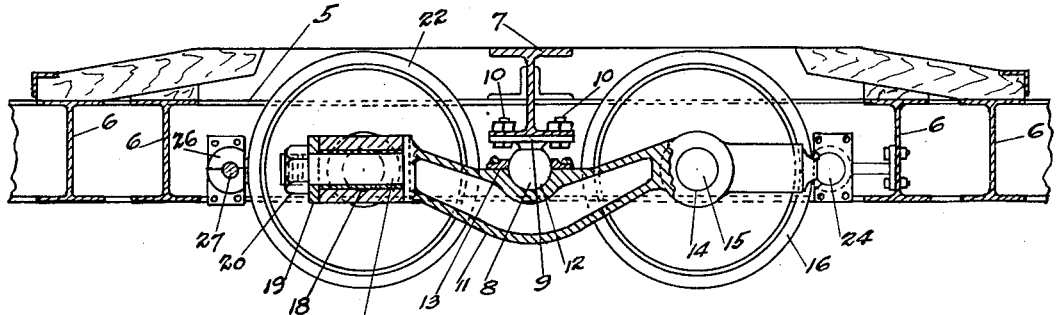
Philip T. Robin
INVENTOR.
BY
ATTORNEYS.

Patented Nov. 28, 1933

1,936,954

UNITED STATES PATENT OFFICE 1,936,954

VEHICLE

Philip T. Robin, Erie, Pa., assignor, by mesne assignments, to The Wellman Engineering Company, Cleveland, Ohio, a corporation of Ohio Application October 25, 1930. Serial No. 491,133

3 Claims. (Cl. 280—81)

In some vehicles, such as trailers which are designed to carry very heavy loads, it is essential that the load be sufficiently distributed to avoid injury to pavements. For this reason such trailers have been supplied with more than two wheels at the rear. The present invention is designed to provide in a convenient manner mountings for eight wheels at the rear of the trailer. Features and details of the invention will appear from the specification and claims.

A preferred embodiment of the invention is illustrated in the accompanying drawing as follows:—

Fig. 1 shows a side elevation of a trailer.

Fig. 2 a rear view of the trailer.

Fig. 3 a plan view of a part of the trailer, part of the deck being removed to better show construction.

Fig. 4 a section on the line 4—4 in Fig. 2.

1 marks the trailer body, 2 the forward projection, or neck, 3 the turn table, 4 a truck carrying the forward end of the trailer.

The frame has side sills 5 and cross beams 6. A cross beam 7 is arranged in the space between the cross beams 6. Preferably it is elevated slightly above the cross beam 6.

A ball 8 has a base 9 which is secured by bolts 10 on the cross piece 7. A bolster 11 extends fore and aft of the cross piece 7. It is provided with a socket 12 receiving the ball 8. A plate 13 locks the ball in the socket.

The front end of the bolster 11 has an axle opening 14 through which an axle 15 extends. Wheels 16 are mounted on the axle 15 at each side of the bolster.

The rear end of the bolster is provided with a trunnion 17 which is pivotally mounted in a sleeve 18. A washer 19 abuts the rear end of the sleeve and this is secured in place by a nut 20 screwed on to the end of the trunnion. Cross axles 21 extend from the sides of the sleeve and wheels 22 are mounted on the axles 21.

It will be noted with this construction that there is universal freedom for the wheels so that all carry their proportionate part of the load. Thus the bolster can tilt to accommodate any lateral unevenness in the support for the front wheels and the sleeve with the axles can swing on the trunnion at the rear to permit the rear wheels to swing as may be necessary to accommodate any unevenness there may be in their supports.

In order to lock the bolster in a fore and aft direction pilot rods 23 are secured by a ball and socket joint 24 to one end of the bolster and at the opposite end by a ball and socket joint 25 with a bracket 26 fixed on the cross member 6 of the frame. These pilot rods are of sufficient length so that any rocking of the bolster relatively to the frame will not disturb very materially the alinement of the bolster fore and aft.

It will be understood that a similar mounting is provided for a second set of four wheels at the opposite side of the frame from that shown in Fig. 3 and a pilot rod 27 is shown which extends to the bolster of this second set.

What I claim as new is:—

1. In a vehicle, the combination of a frame; a fore and aft extending bolster; a universal connection between the bolster and frame; cross axles toward one end of and rigid with relation to the bolster; a trunnion toward the opposite end of the bolster; a sleeve on the trunnion; cross axles extending from the sleeve; and wheels on the axles on each side of the bolster and equally spaced from the axis thereof.

2. In a vehicle, the combination of a frame; a fore and aft extending bolster; a universal connection between the bolster and frame, said connection being positively locked against severance under thrust from any direction; cross axles on the bolster at the front and rear thereof, one of said cross axles being pivotally connected with the bolster; wheels on the axles on each side of the bolster and equally spaced from the axis thereof; and a pilot rod extending crosswise of the frame connecting the bolster and the frame.

3. In a vehicle, the combination of a frame; a fore and aft extending bolster; a universal connection between the bolster and frame; cross axles on the bolster toward the front and rear thereof, one of said cross axles being pivotally connected with the bolster; wheels on the axles on each side of the bolster and equally spaced from the axis thereof; and a pilot rod pivotally connected to the bolster and the frame, the points of connection being laterally off-set.

PHILIP T. ROBIN.